(12) United States Patent
Xu et al.

(10) Patent No.: US 9,838,990 B2
(45) Date of Patent: Dec. 5, 2017

(54) METHOD, APPARATUS AND SYSTEM FOR UPLINK SYNCHRONIZATION

(75) Inventors: Fangli Xu, Beijing (CN); Yali Zhao, Beijing (CN); Jiamin Liu, Beijing (CN); Yi Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 306 days.

(21) Appl. No.: 13/504,922

(22) PCT Filed: Oct. 29, 2010

(86) PCT No.: PCT/CN2010/078231
§ 371 (c)(1),
(2), (4) Date: Apr. 27, 2012

(87) PCT Pub. No.: WO2011/050743
PCT Pub. Date: May 5, 2011

(65) Prior Publication Data
US 2012/0218988 A1    Aug. 30, 2012

(30) Foreign Application Priority Data
Oct. 30, 2009  (CN) .......................... 2009 1 0235960

(51) Int. Cl.
*H04J 3/06*   (2006.01)
*H04J 11/00*  (2006.01)
*H04W 56/00*  (2009.01)

(52) U.S. Cl.
CPC ............................. *H04W 56/0045* (2013.01)

(58) Field of Classification Search
CPC . H04W 56/00; H04W 56/001; H04W 56/005; H04W 56/0035; H04W 72/04; H04J 3/06
(Continued)

(56) References Cited

U.S. PATENT DOCUMENTS

2011/0170535 A1*  7/2011  Wang et al. ................... 370/350
2012/0063425 A1*  3/2012  Wang et al. ................... 370/336
(Continued)

FOREIGN PATENT DOCUMENTS

CN   101388722 A   3/2009
CN   101394223 A   3/2009
(Continued)

OTHER PUBLICATIONS

International Search Report issued in International Application No. PCT/CN2010/078231 dated Feb. 10, 2011.
(Continued)

*Primary Examiner* — Hanh N Nguyen
(74) *Attorney, Agent, or Firm* — Handal & Morofsky LLC (57) ABSTRACT

A method, an apparatus and a system for uplink synchronization are disclosed by the embodiment of the invention. The method includes the following steps: a network equipment configures multi-carrier operation mode for a user equipment and obtains the timing advance TA group message corresponding to each of component carrier CC of the user equipment; the network equipment maintains the TA timer of each TA group according to the TA group information to be uplink synchronized with the user equipment. The embodiment of the invention provides the establishment and maintenance mechanism for uplink synchronization in the case that the timing advance of each component carrier CC is different in the multi-carrier system.

12 Claims, 10 Drawing Sheets

(58) Field of Classification Search
USPC ....... 370/329, 330, 328, 331, 341, 350, 344, 370/410, 443, 44, 445, 446, 464, 338, 370/203–208
See application file for complete search history.

(56) References Cited

U.S. PATENT DOCUMENTS

2012/0099577 A1* 4/2012 Baldemair et al. ............ 370/338
2012/0218987 A1* 8/2012 Zhao et al. .................. 370/350

FOREIGN PATENT DOCUMENTS

| CN | 101540634 A | 9/2009 |
|---|---|---|
| WO | 2007107128 A1 | 9/2007 |

OTHER PUBLICATIONS

Supplementary European Search Report issued in Application No. EP10826106, dated Mar. 22, 2013.
Notification of Rejection Issued by The Korean Patent Office, issued in Korean Application No. 9-5-2014-005473808, dated Jan. 23, 2014 (In Korean).
Notification of Rejection Issued by The Korean Patent Office, issued in Korean Application No. 9-5-2014-005473808, dated Jan. 23, 2014 (In English).
Office Action issued in Chinese patent application No. 200910235960.5, dated May 13, 2013 (in Chinese).
Office Action issued in Chinese patent application No. 200910235960.5, dated May 13, 2013 (in English).
Notification of Rejection Issued by the Korean Patent Office, issued in Korean Application No. 10-2012-7010748, dated Sep. 29, 2013 (In Korean).
Notification of Rejection Issued by The Korean Patent Office, issued in Korean Application No. 10-2012-7010748, dated Sep. 29. 2013 (In English).
3GPP TSG RAN WG2 #58-NTT DoCoMO, Inc., Uplink Synchronization Maintenance, R2-072014, May 7-11, 2007, Kobe, Japan.
3GPP TSG RAN WG2 Meeting #67bis, Reply LS on RAN2 status on carrier aggregation, R2-095422, Oct. 12-16, 2009, Miyazaki, Japan.
Notification of Rejection Issued by The Korean Patent Office, issued in Korean Application No. 10-2012-7010748, dated Jan. 23, 2014 (In Korean).
Notification of Rejection Issued by The Korean Patent Office, issued in Korean Application No. 10-2012-7010748, dated Jan. 23, 2014 (In English).
Office Action issued in Chinese patent application No. 200910235960.5 dated May 13, 2013 (in Chinese).
Notification of Rejection Issued by The Korean Patent Office, issued in Korean Application No. 10-2012-7010748, dated Sep. 29, 2013 (In English).
3GPP TSG RAN WG2 #58-NTT DoCoMO, Inc., Uplink Syncllronization Maintenance, R2-072014, May 7-11, 2007, Kobe, Japan.
3GPP TSG RAN WG2 Meeting #67bis, Different Timing Advance Impact on Carrier Aggregation, Oct. 12-Oct. 16, 2009, Miyazaki, Japan.
3GPP TSG-RAN WG2 Meeting #67bis-RACH and carrier aggregation, Nokia Corporation, Nokia Siemens Networks, Oct. 12-Oct. 16, 2009, Miyazaki, Japan.
TSG-RAN Working Group 4(Radio) meeting #52—Comments related to Timing Advance: Reply LS on RAN2 Status on Carrier Aggregation, Aug. 24-28, 2009, Shenzhen, China.

* cited by examiner

METHOD, APPARATUS AND SYSTEM FOR UPLINK SYNCHRONIZATION

The priority of the Chinese patent application with the application date of Oct. 30, 2009, the application number of 200910235960.5, and the patent name of "method system and device for uplink synchronization", all content of the priority application are combined into the present application by quoting.

FIELD OF THE PRESENT INVENTION

The present invention relates to the field of mobile communication technology, and more particularly to method system and device for uplink synchronization.

BACKGROUND OF THE PRESENT INVENTION

Figure 1:
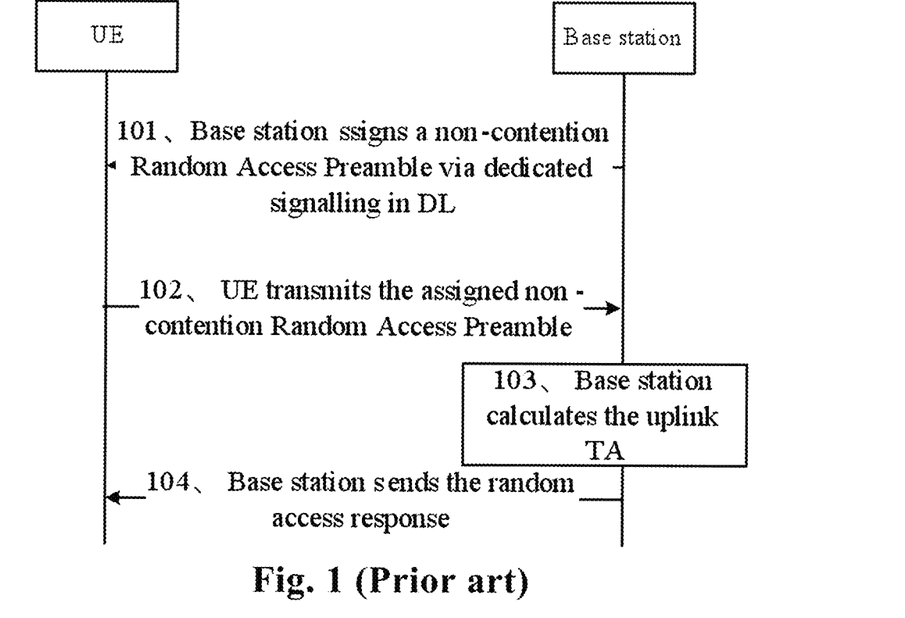
FIG. 1 is a process schematic diagram of the non-contention based random access of the present technology.

As an important mechanism of the system of long term evolution (LTE), the random access procedure impacts user experience. Specifically, random access procedure is the access procedure before a user equipment (UE) communicates with network at begins; it can be understood as a channel application process. The random access procedure is performed for the following six events: initial access from RRC_IDLE, radio resource control (RRC) connection re-establishment procedure, handover, downlink (DL) & uplink (UL) data arrival during RRC_CONNECTED requiring random access procedure, and for positioning purpose during RRC_CONNECTED requiring random access procedure. For the events of DL data arrival and handover, non-contention based random access procedure could be used, as shown in FIG. 1, comprising the following steps:

Step 101, the base station assigns to UE a non-contention Random Access Preamble via dedicated signaling in DL.

Specifically, the signaling includes handover (HO) command generated by target eNB and sent via source eNB for handover and HO command generated by target eNB and sent via source eNB for handover;

Step 102, UE transmits the assigned non-contention Random Access Preamble.

Step 103, the base station calculates the uplink timing advance (TA) based on the preamble reception.

Step 104, the base station sends the random access response (RAR), and UE derives the TA information included in the RAR to obtain the uplink synchronization.

Figure 2:
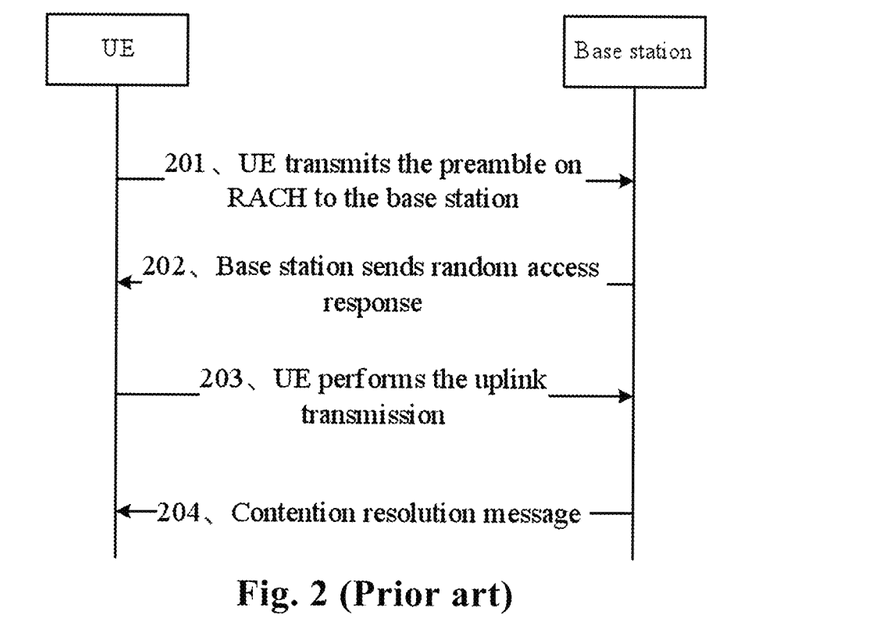
FIG. 2 is a process schematic diagram of the contention based random access of the present technology.

For the other events, contention based random access procedure would be used, as shown in FIG. 2, comprising the following steps:

Step 201, UE selects the random access preamble and packet random access channel (PRACH) resource which is obtained from system information and transmits the preamble on RACH to the base station.

Step 202, the base station calculates TA based on the random access preamble reception, and sends random access response to UE. The RAR message Conveys at least RA-preamble identifier, TA information, initial UL grant and assignment of Temporary C-RNTI Step 203, UE performs the uplink transmission in the assigned UL grant.

Specifically, to different random access reasons, the content of uplink transmission is different. For example, to initial access, the content of uplink transmission is RRC connection request.

Step 204, UE receives the contention resolution message from the base station, and judges whether the random access is successful.

Figure 3:
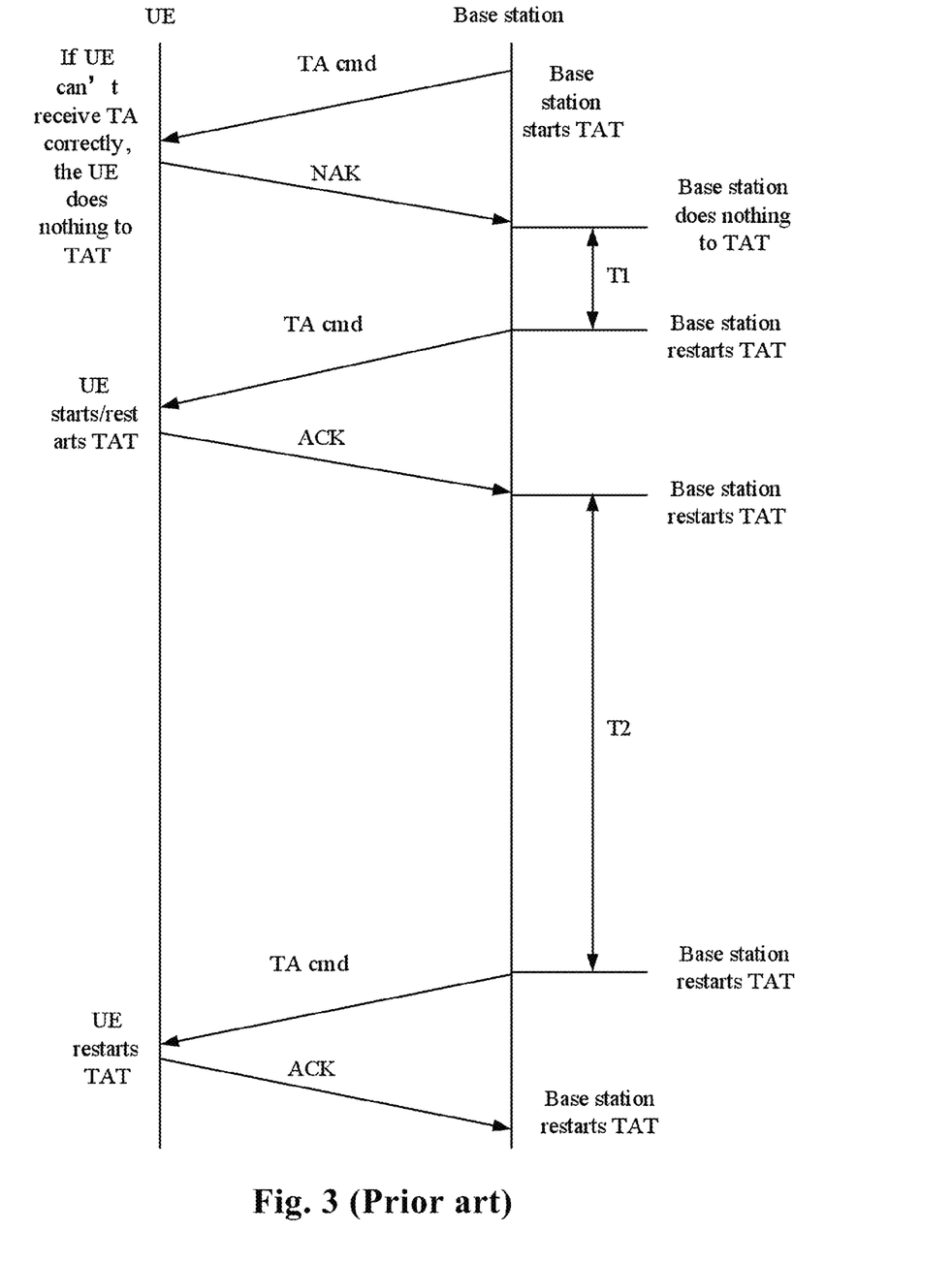
FIG. 3 is a process schematic diagram of an uplink synchronization maintenance of the present technology.

Besides the above random access mechanism, LTE system also designs uplink synchronous procedure, which is used for keeping the uplink synchronization between UE and base station, in order for UE to transmit uplink data and hybrid automatic repeat quest (HARQ) feedback which is related to the DL transmission. In LTE system base station is in charge of uplink synchronization maintenance. Specifically, when UE performing random access, the base station acquires original TA by preamble, the following uplink synchronous maintenance is as shown in FIG. 3, comprising: the base station and UE maintain a timing advance timer (TAT) respectively, the base station sends TA command to UE, if the UE can't receive TA command correctly, then the UE does nothing to TAT, and the base station resends TA command; if the UE receives TA command correctly, then UE starts the TAT IN UE side and sends HARQ-ACK information to the base station, the base station restarts its TAT based on it. If the TAT is running, the base station and UE would regards the uplink sync state is in-sync.

As a evolution of LTE technology, the peak rate of LTE-A system has been greatly improved relative to the LTE system, which can be reached as downlink 1 Gbps and uplink 500 Mbps. Of course, LTE-A system need to keep good backward-compatibility with the LTE system. Based on the demand of peak rate improvement, backward-compatibility with LTE system and improving the spectrum efficiency, the LTE-A system introduces carrier aggregation (CA) technology. The CA technology is that the uplink and downlink includes more than one component carrier (CC) respectively, in the LTE system UE only works in one carrier. In the system with carrier aggregation, the aggregated carriers can be continuous or non-continuous, to compatible with LTE system, the max bandwidth of each carrier is 20 MHz, the bandwidth of each carrier can be same or different.

Figure 4:
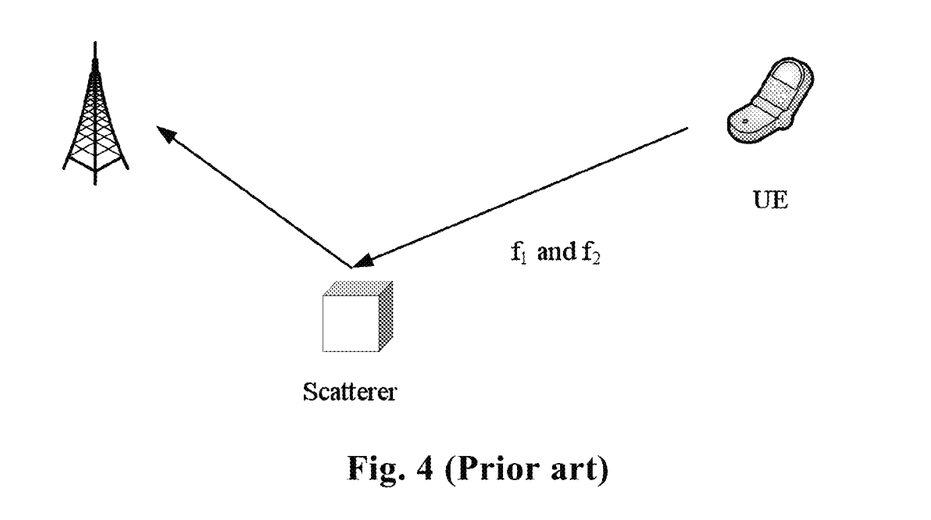
FIG. 4 is a deployment scenario schematic diagram of an uplink synchronization of the present technology.
Figure 5:
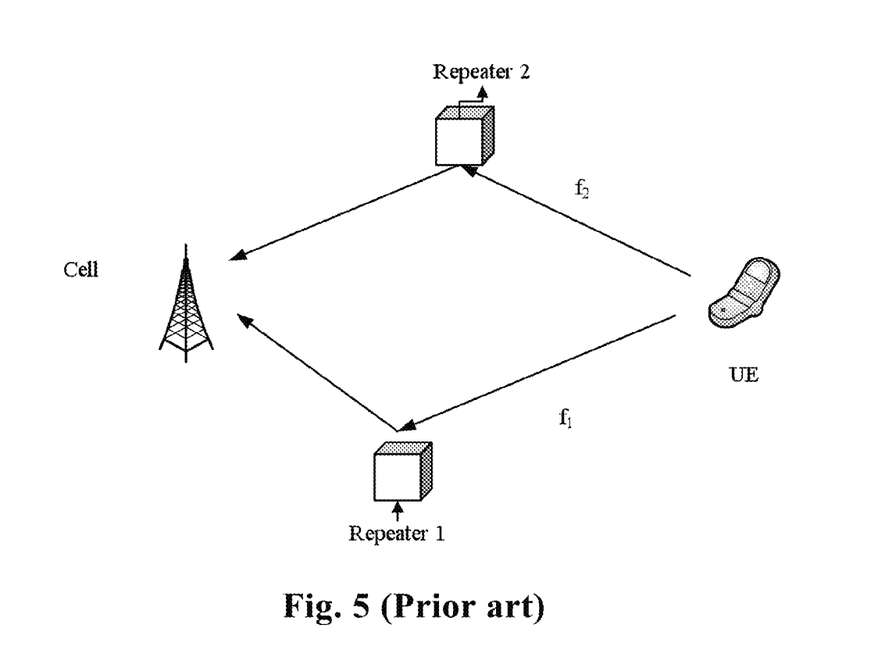
FIG. 5 is a deployment scenario schematic diagram of another uplink synchronization of the present technology.
Figure 6:
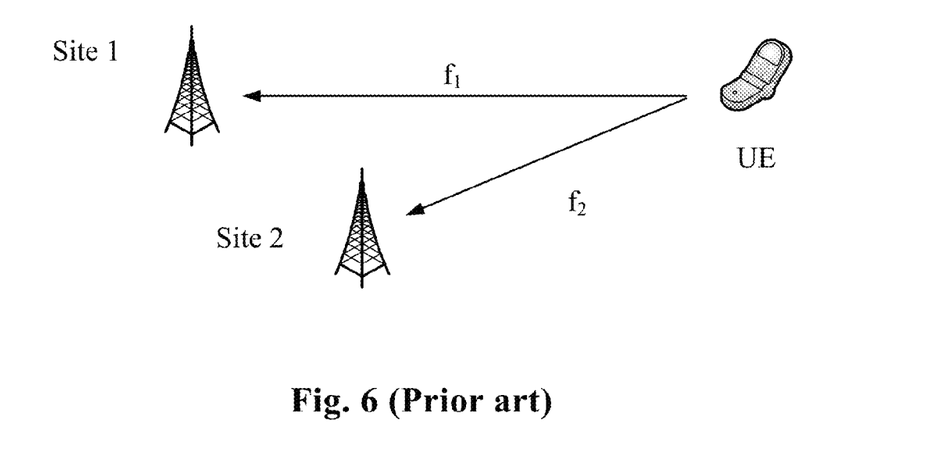
FIG. 6 is a deployment scenario schematic diagram of other uplink synchronization of the present technology.

There are four deployment scenarios of uplink synchronization in $3^{rd}$ generation partnership project radio access network (3GPP RAN4) to: for the scenarios without repeater, radio remote unit (RRU) and coordinated multiple points (CoMP), TA of each CC is the same, as shown in FIG. 4; for the scenarios with repeater, since repeater has the different frequency selectivity, TA of each CC may be different, as shown in FIG. 5; In Non-collocated Sites, TA of each CC may be different, as shown in FIG. 6; To uplink CoMP, the TA is different to the different sites of participating in collaboration.

In the process of achieving this present invention, the inventor found that there are at least the problems of existing technology:

In LTE-A system, with the introduction of multicarrier, the uplink synchronization timing advance of each CC may be different. In the present LTE-A agreement, there is no any description and design about the uplink synchronization establishing and maintaining the mechanism.

SUMMARY OF THE PRESENT INVENTION

Embodiments of the present invention provide a kind of method, device and system for uplink synchronization, which is used for providing the establishing and maintaining the mechanism of uplink synchronization in the multicarrier system when the uplink timing of each CC is different.

Embodiments of the present invention provide a kind of method for uplink synchronization, comprising:

The network device configures a multicarrier work mode for UE, and achieves the said UE's TA group information of each component carrier;

The network device maintains the TA timers of each TA group, and maintains the uplink synchronization per TA group.

Embodiments of the present invention provide a kind of network device, comprising:

The first configuration module, which is used for configuring a multicarrier work mode to UE;

Obtaining module, which is used for obtaining the TA group information of each component carrier configured to the UE in the first configuration module;

Maintenance module, which is used for TA timer and uplink synchronization of each TA group for UE.

Embodiments of the present invention provide a kind of UE, comprising:

The first configuration module, which is used for the UE to configure a multicarrier work mode itself;

Obtaining module, which is used for obtaining the UE's TA group information;

Maintenance Module, which is used for maintaining the TA timer and uplink synchronization with the network side per TA group.

Embodiments of the present invention provide a kind of system for uplink synchronization, comprising:

The network device, which is used for configuring a multicarrier work mode to UE, and obtaining the UE's TA group information; maintaining the TA timer and uplink synchronization with the UE per TA group;

The UE, which is used for receiving the multicarrier work mode configuration from network device, and maintaining uplink synchronization with the network device.

Embodiments of the present invention has the following advantages: by obtaining the TA group information of UE's each CC, maintaining the TA timer per TA group and maintaining uplink synchronization of each CC in TA group unit, it is provided the uplink synchronization establishing and maintenance mechanism in the multi-TA multi-carrier system.

DETAILED DESCRIPTION OF THE EMBODIMENTS OF THE PRESENT INVENTION

Embodiments of the present invention provide an per TA group uplink synchronization maintenance mechanism in case that the aggregated carriers are with different uplink timings. The mechanism is that the network and UE's working carriers are divided into different TA groups, and each TA group could include one or more CCs, and the uplink timings on these CCs are maintained in TA group unit.

In the following parts, clear and complete descriptions of the technology programs of the present invention are made combined with drawings of the embodiments. It is clear that the embodiments of the present invention described here are only parts of the embodiments of the present invention. According to the embodiments of the present invention, any other embodiments made by technical personnel of the field in the absence of creative work are all belong to the scope of the patent protection of the invention.

Figure 7:
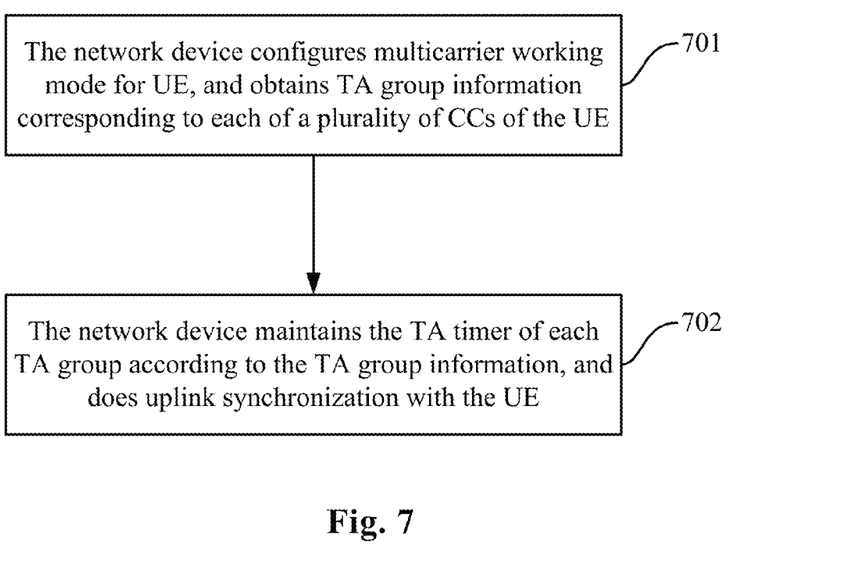
FIG. 7 is a flow diagram of an uplink synchronization of first embodiment of the present invention.

As shown in FIG. 7, it is a flow diagram of an uplink synchronization of first embodiment of the present invention, comprising:

Step 701, the network device configures multicarrier working mode for UE, and obtains TA group information corresponding to each of a plurality of CCs of the UE.

Specifically, the network device obtains the TA group information corresponding to each of the plurality of CCs of the UE, comprising: the network device divides the said UE's CCs to different TA groups, according to the network deployment or the data transmission on each CC by the UE; or the network device divides different CCs to different TA groups.

The network device can divide UE's multiple CCs to N TA groups according to the network deployment, wherein N represents an integer greater than one. Assume CC1 and CC2 transport by SITE 1, CC3 and CC4 transport by SITE 2, if CC1/2/3/4 is configured to UE at the same time, the network device can configure CC1 and CC2 belonging to TA group 1, CC3 and CC4 belonging to TA group 2; if network device can't know in advance that the UE's multiple CCs uplink transmission path information, network device can direct divide UE's TA groups according to the data transmission on multiple CC by the UE, and consider the CC of the same uplink transmission situation into the same TA group.

The network device could divide the CCs into the plurality of TA groups according to frequency bands that each of the CCs belongs to and are set for the UE. For example, the network device could divide the CCs in the same frequency band into the same TA group.

After the network device obtains the said UE's TA group information, it can configure TA group to the UE. Specifically, the network device configures each CC's TA group information or configures the relationship between CC and TA group to the UE according to RRC signal or media access control (MAC) control element (CE).

Therein, in the case that the network device knows in advance about TA group partition, the network side can configure the relationship between TA group and CC to UE by RRC signal or MAC CE; in the case that the network device obtains the TA group partition in dynamic way, the network side can configure UE about the relationship between CC and TA group by RRC signal or MAC CE; the network device can also carry all the carrier numbers in the sending TA MAC CE for which the TA can be applied, and the carriers indicated by the carrier number in the MAC CE is from same TA group, and UE could obtains the relationship between TA group and CC by timing advance command (TAC) MAC CE.

Specifically, the MAC CE includes the following format:

Format 1: it can add group ID numbers in MAC CE; one TAC which is applied to one TA group. The format of MAC CE can show in table 1:

TABLE 1

| MAC CE structure beckoned table one |
| GROUP BITMAP |
| --- |
| TAC- group 1 |
| TAC- group 2 |
| TAC- group n |

Therein, group bitmap is the bitmap of TA group numbers, for example, 00000101 mean that the MAC CE includes the TA information of TA group 1 and 3; and the following fields are the TAC of each TA group.

When each TAC MAC CE only carries one TA group's TAC, the format of MAC CE can show in table 2:

TABLE 2

| MAC CE structure beckoned table two |
| GROUP BITMAP |
| --- |
| TAC- group 1 |

When each TAC MAC CE only carries one TAC of one TA group, the group number is reused the current two reserved bits, as shown in 3, apply to only four TA group.

TABLE 3

| MAC CE structure beckoned table three | | |
| --- | --- | --- |
| R | R | TAC |

Therein, R means reserved bit.

Format 2: Adding carrier ID numbers to MAC CE, the TAC in MAC CE is applied to one carrier. The format of MAC CE can show in table 4:

TABLE 4

| MAC CE structure beckoned table four | | |
| --- | --- | --- |
| CI | | |
| R | R | TAC |

Therein, CI is carrier number.

When using two reserved bit show carrier number, as shown in format 3, it could be only applied to only four CCs.

Format 3: Adding frequency Number group in MAC CE and the TAC in each MAC CE is applied to a group of frequency which is indicated in the CI bitmap, as shown in format 5. For example, 00000111 mean that the said TAC is applied to CC1/2/3, and UE can know CC1/2/3 belong to a TA group. UE also can know the relationship between the CC and TA groups according to the CI combination information of CI BITMAP in MAC CE, and maintain the CC's UL synchronization by TA group.

TABLE 5

| MAC CE structure beckoned table five | | |
| --- | --- | --- |
| CI BITMAP | | |
| R | R | TAC |

Format 4: The form of MAC CE and Rel-8 is the same.

After the network device configures TA group information to the UE, the UE maintains the TA timer of each TA group according to the TA group information, and does uplink synchronization per TA group with the network device. Specifically, when receiving the TA command for the TA group or the CC which is belonging to the TA group, the UE should restart the TA group's TA timer, and apply the TA command on all CC in TA group.

After the network device configured a multicarrier work pattern for UE, the UE maintains the TA timer of each CC, and does uplink synchronization with the network device.

The said UE could obtain the TA group configuration according to the same principle as network devices. Specifically, the UE and the network device regard the CCs in the same frequency band as the same TA group respectively. Therein to, it is an implicit TA group configuration that the CCs in the same frequency band are configured into one TA group. With the said way, it is unnecessary for the network device to explicitly configure UE the TA group information, network device and UE can know automatically the TA group configuration according to the configured CCs' frequency information.

Step 702, the network device maintains the TA timer of each TA group according to the TA group information, and does uplink synchronization with the UE.

Therein, TA timer can configure per TA group, or per CC or per UE.

Specifically, the network device maintains the TA timer of each CC according to the TA group configuration, comprising that the network device measures the UE's TA information of each CC, and sends the TA command to UE via the CCs belonging to same TA group or a fixed CC of the TA group, and perform the RA procedure for uplink synchronization.

When UE maintains the TA timer per TA group, if the network device measures TA information of UE in some CC, includes RACH or uplink data transmission, it would send the TA information to UE by any one CC or fixed CC in the TA group; when UE receives the TA command on the CC belonging to the TA group, the UE restarts the TA timer of TA group follow Rel-8 behavior, and using the TA information on all CC of the TA group. The MAC CE formats applied to the said maintain way are format 1, format 2 and format 4.

When the network device maintains the uplink synchronization per TA group for one UE, but the UE maintains the uplink synchronization and TA timer per CC, if the network device learns the relationship between CCs and TA groups, when the network device obtains the TA information on some CC in a TA group by measurement, then it thinks the TA information can be applied to other CC in the same TA group, and notice UE about the CCs' TAC through MAC CE; UE maintains the TA timer per CC, and restarts the TA timer following Rel-8 behavior, and applies the TA to the indicated CCs. The MAC CE format applied to the said maintaining way is format 3.

The network device and UE can use the way by every TA group only had a CC, and maintain CC's synchronization and TA timer. The MAC CE formats applied to the said maintaining way are format 2 and format 4.

When network device and UE maintains TA's synchronization and TA timer by TA group, after network device measures TA information of UE in some CC, it sends the said TA information to UE via any one CC or fixed CC in TA group; UE gets the relationship between CC and TA group from MAC CE, then maintaining TA timer according to the TA group; When TA command is received for one CC of a TA group, the UE should restart the TA timer of the TA group following Rel-8 behavior, and apply the TA information on all CCs of the TA group. The MAC CE formats applied to the said maintain way are format 3.

The invention of the example technology scheme has the following advantages, by obtaining TA group information for which the CC is belonging to for one UE, and maintaining the TA timer of each CC according to the TA group, performing uplink synchronization, it is provided an uplink synchronization maintenance mechanism in the multiple uplink timing CA system.

Figure 8:
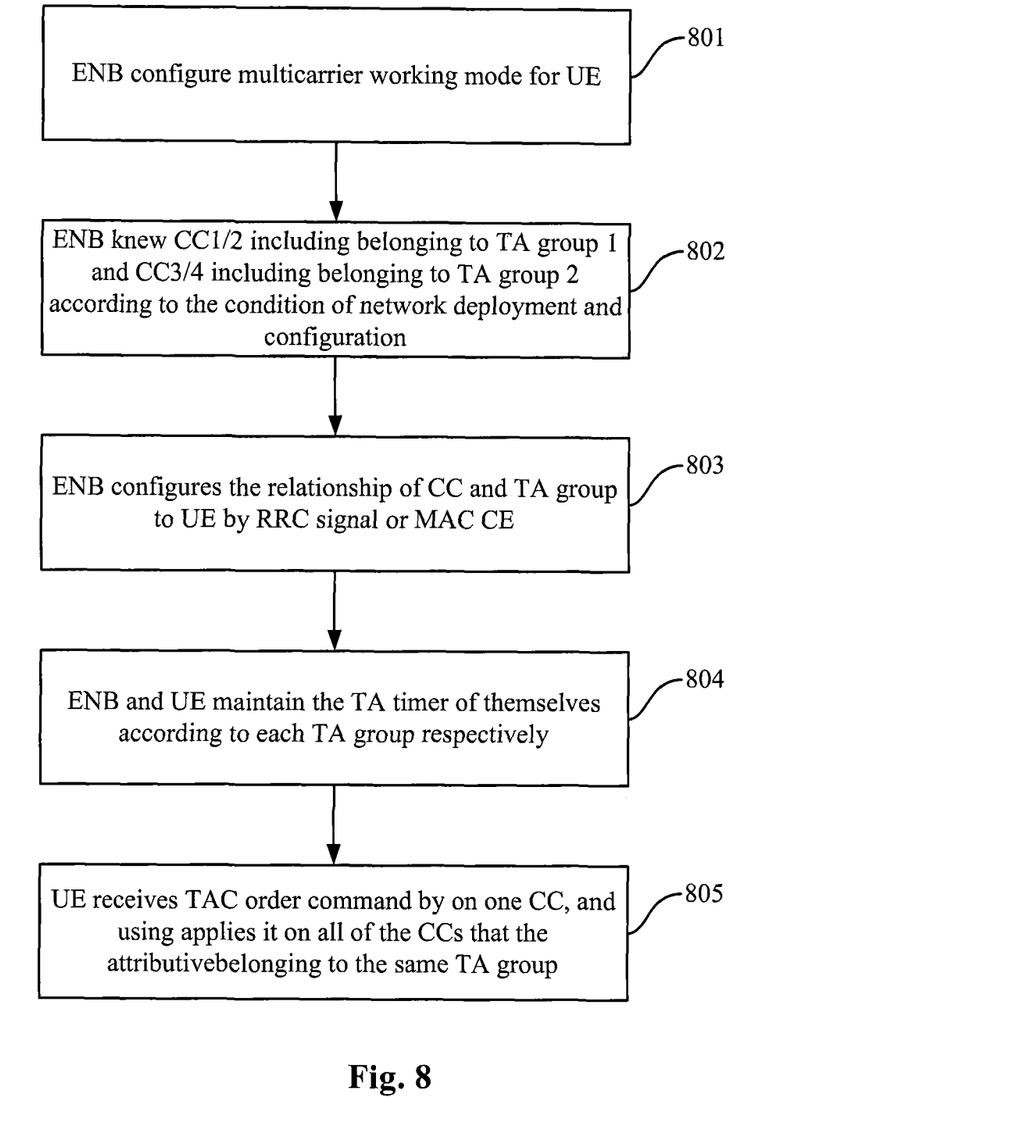
FIG. 8 is a flow diagram of an uplink synchronization of second embodiment of the present invention.

As shown in FIG. 8, is a flow diagram of an uplink synchronization of second embodiment of the present invention, comprising:

Step 801, ENB configure multicarrier working mode for UE.

For example, the carrier of UE is CC1/2/3/4.

Step 802, ENB knew CC1/2 belonging to TA group 1 and CC3/4 belonging to TA group 2 according to the network deployment and configuration.

Step 803, ENB configures the relationship of CC and TA group to UE by RRC signal or MAC CE.

Step 804, ENB and UE maintain the TA timer of themselves according to each TA group respectively.

Specifically, if the TA timer of a CC corresponding of TA group is expired, then determines all the CC of TA out-of-sync, releasing all of the resource of CC, including the resource of PUCCH, SRS, and SPS and so on.

Step, 805, UE receives TAC command on one CC, and applies it on all CCs belonging to the same TA group.

The invention of the example technology scheme has the following advantages, by obtaining TA group information the CC corresponding of UE, and maintaining the TA timer of each CC according to TA group configuration, performing uplink synchronization, it is provided an per CC uplink synchronization mechanism in multiple uplink timing CA system.

Figure 9:
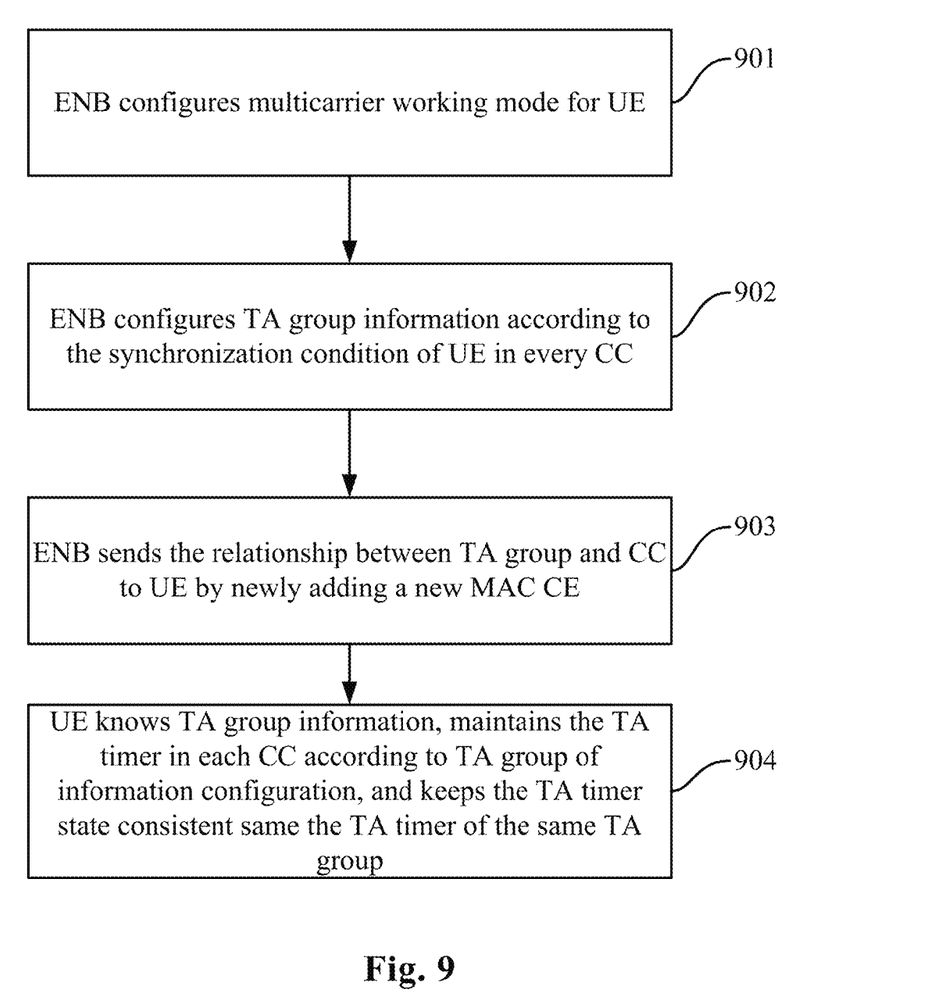
FIG. 9 is a flow diagram of an uplink synchronization of third embodiment of the present invention.

As shown in FIG. 9, it is a flow diagram of an uplink synchronization of third embodiment of the present invention, comprising:

Step 901, ENB configures multicarrier working mode for UE.

For example, the carrier of UE is CC1/2/3/4.

Step 902, ENB configures TA group information according to the synchronization condition of UE in every CC.

For example, ENB knows the TA condition of CC 1/2 same or similar, the TA condition of CC 3/4 same or similar, then eNB configures CC 1/2 belonging to TA group 1 and CC 3/4 belonging to TA group 2.

Step 903, ENB sends the relationship between TA group and CC to UE by a new MAC CE.

Step 904, UE knows TA group information, maintains the TA timer in each CC according to TA group configuration, and keeps the TA timer state same of the same TA group.

Specifically, if the TA timer of a CC is expired, then all the CCs of the related TA group are regarded as out-of-sync, and UE should release all of the resource of CC, including the resource of PUCCH, SRS, and SPS and so on.

The invention of the example technology scheme has the following advantages, by obtaining TA group information the CC corresponding of UE, and maintaining the TA timer of each CC according to TA group information, performing uplink synchronization, it is provided a uplink synchronization maintenance mechanism for the case of different uplink timings on different CCs.

Figure 10:
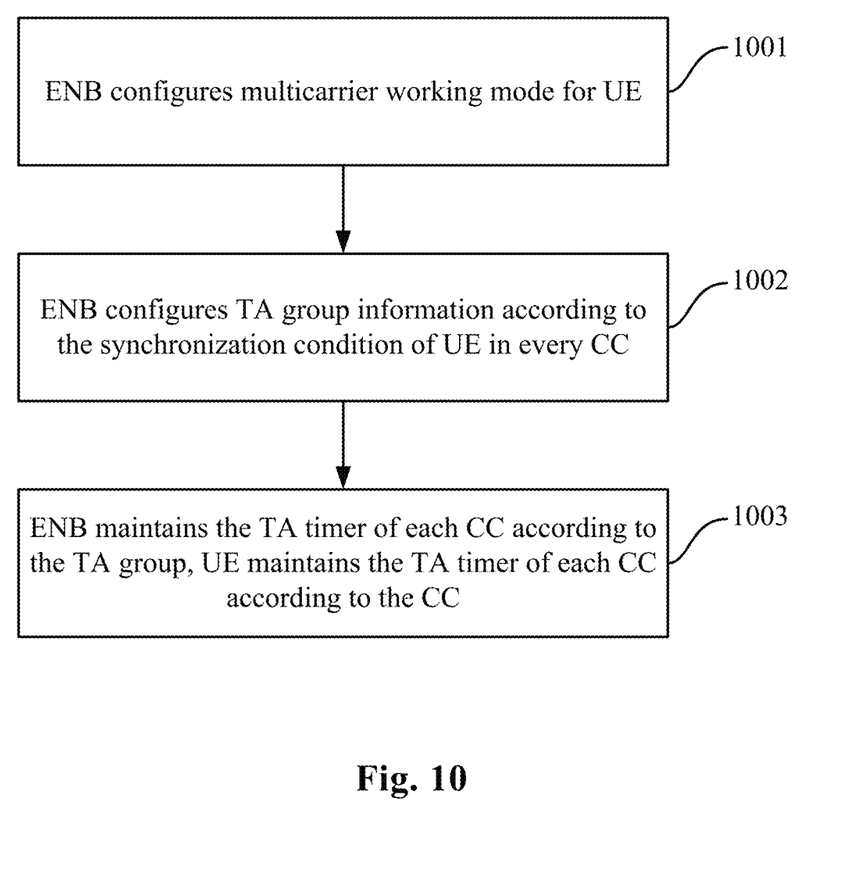
FIG. 10 is a flow diagram of a uplink synchronization of forth embodiment of the present invention.

As shown in FIG. 10, it is a flow diagram of an uplink synchronization of forth embodiment of the present invention, comprising:

Step 1001, ENB configures multicarrier working mode for UE.

For example, the carrier of UE is CC1/2/3/4.

Step 1002, ENB configures TA group information according to the synchronization condition of UE in every CC.

For example, ENB knows the TA condition of CC 1/2 same or similar, the TA condition of CC 3/4 same or similar, then eNB configures CC 1/2 belonging to TA group 1 and CC 3/4 belonging to TA group 2.

Step 1003, ENB maintains the TA timer of each CC according to the TA group, UE maintains the TA timer of each CC according to the CC.

Specifically, ENB achieves the TA information on a CC, can assure that the TA information can apply on all the CC in the same TA group, and eNB signals the UE the TAC command and the related CCs on which the TAC could be applied; In additional, UE only apply the TA value obtained from RA procedure only on the CC on which performing the RA during the RA procedure. If one CC's TA timer is expired, the CC is regarded out-of-sync, and UE should release all of the resource of the CC, including the resource of PUCCH, SRS, and SPS and so on.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Figure 11:
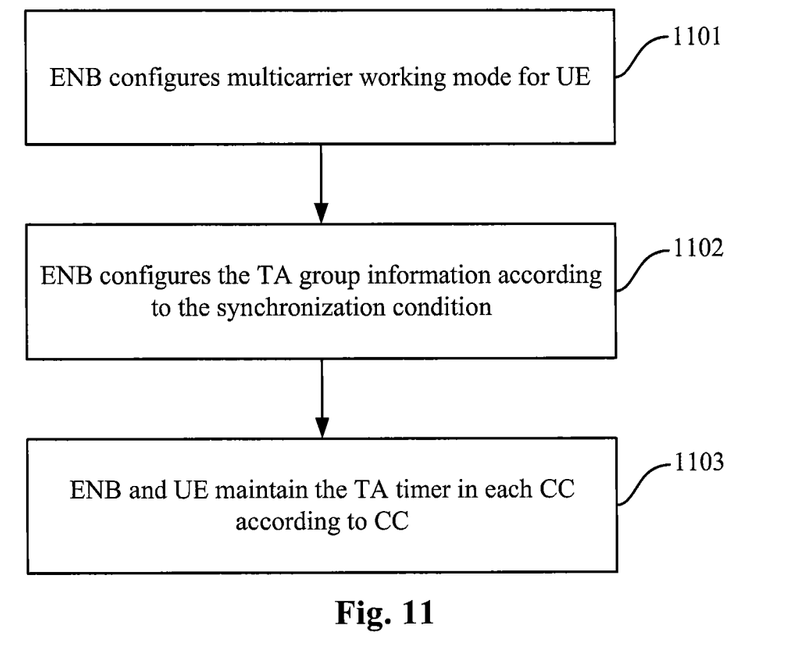
FIG. 11 is a flow diagram of an uplink synchronization of fifth embodiment of the present invention.

As shown in FIG. 11, it is a flow diagram of an uplink synchronous of fifth embodiment of the present invention, comprising:

Step 1101, ENB configures multicarrier working mode for UE.

For example, the carrier of UE is CC1/2/3/4.

Step 1102, ENB configures the TA group information according to the synchronization condition.

For example, ENB knows the TA condition of CC 1/2 same or similar, the TA condition of CC 3/4 same or similar, then configures CC 1/2 belonging to TA group 1 and CC 3/4 belonging to TA group 2.

Step 1103, ENB and UE maintain the TA timer in each CC according to CC.

Specifically, ENB achieves the TA information from a CC, can be sure that the TA information only apply to the CC, and eNB notices the UE about the TAC and the applied CC with the TAC command; and UE achieves the TAC order from some CC, for example from RACH process, it can be only applied on the CC. If the TA timer of one CC is expired, the CC is determined out-of-sync, and UE should release all of the resource of the CC, including the resource of PUCCH, SRS, and SPS and so on.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Figure 12:
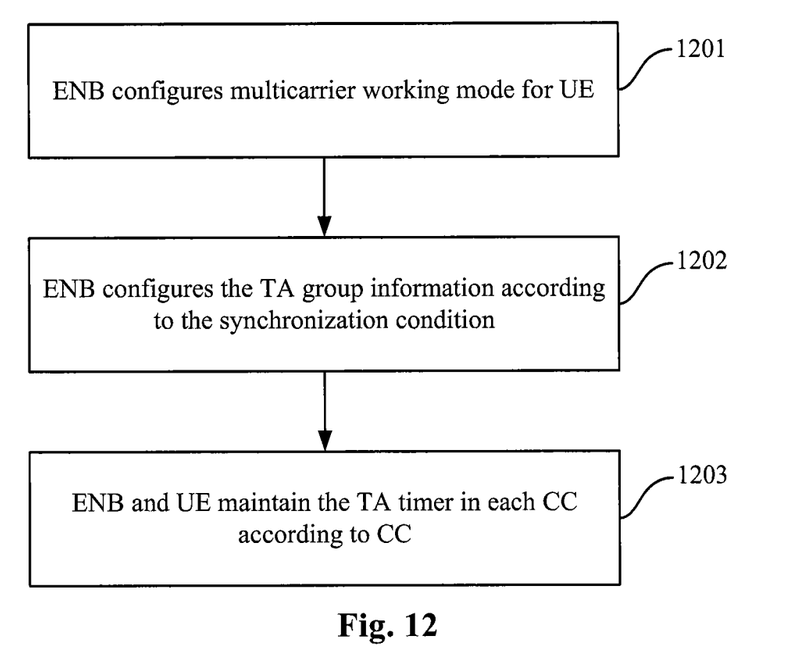
FIG. 12 is a flow diagram of an uplink synchronization of sixth embodiment of the present invention.

As shown in FIG. 12, it is a flow diagram of an uplink synchronous of sixth embodiment of the present invention, comprising:

Step 1201, ENB configures multicarrier working mode for UE.

For example, the carrier of UE is CC1/2/3/4.

Step 1202, ENB configures the TA group information according to the synchronization condition.

For example, ENB knows the TA condition of CC 1/2 same or similar, the TA condition of CC 3/4 same or similar, then configures CC 1/2 belonging to TA group 1 and CC 3/4 belonging to TA group 2.

Step 1203, ENB and UE maintain the TA timer in each CC according to CC.

Specifically, ENB achieves the TA information from a CC, can be sure that the TA information can be applied on all the CC of the TA group, and eNB notices the UE the TA value and the applied CCs in TAC command; but if UE obtains the TAC command during RA procedure, it can be applied to all the CCs in the same TA group. If one CC's TA timer is expired, all the CCs belonging to the same TA group should be regarded as out-of-sync, and UE should release all of the resource of the CC, including the resource of PUCCH, SRS, and SPS and so on.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Figure 13:
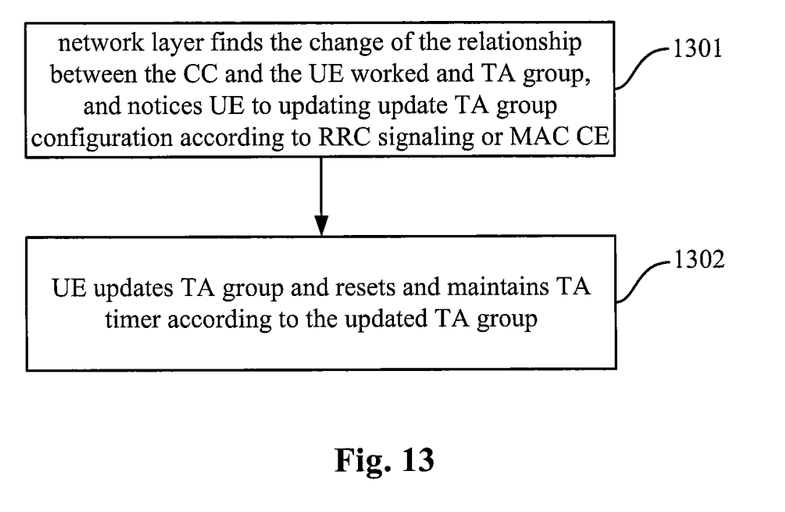
FIG. 13 is a flow diagram of an uplink synchronization of seventh embodiment of the present invention.

As shown in FIG. 13, it is a flow diagram of an uplink synchronous of seventh embodiment of the present invention;

Step 1301, network layer finds the change of the relationship between the CC and the TA group, and notices UE to update TA group configuration according to RRC signaling or MAC CE.

Therein, MAC CE is used for noticing the TA adjustment of each TA group, as shown in table 6.

TABLE 6

| MAC CE structure beckoned table six | |
|---|---|
| GID 1 | CI BITMAP |
| GID 2 | CI BITMAP |
| GID 3 | CI BITMAP |
| GID . . . | CI BITMAP . . . |

Therein, GID N is the TA adjustment, CI BITMAP is using for showing the relationship of CC and GID N, using the form of bitmap to identify the carrier group of the latter TA value corresponded. For example, the length of bitmap is 5 bit, if the corresponding bit is 1, then the part after bitmap will include the TA information of the corresponded carrier group. When bitmap is 01001, then shows the part after bitmap will include the TA information of two corresponded carrier groups.

The relationship between a bit of bitmap and the corresponded carrier group can use each of the following ways: indexing according the sequence the UE uplink carrier group corresponded downlink carrier group ID; the early or late sequence the carrier group configured to user; indexing according to the information of carrier group the system broadcasting sent; indexing according to the sequence the RRC or MAC signal or physical layer signaling noticed carrier group; indexing according to the way other can make the UE ensure the carrier group sequence.

Step 1302, UE updates TA group and resets and maintains TA timer according to the updated TA group.

Need to explain, this invention method can adjust according to the actual needs of each step order.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Figure 14:
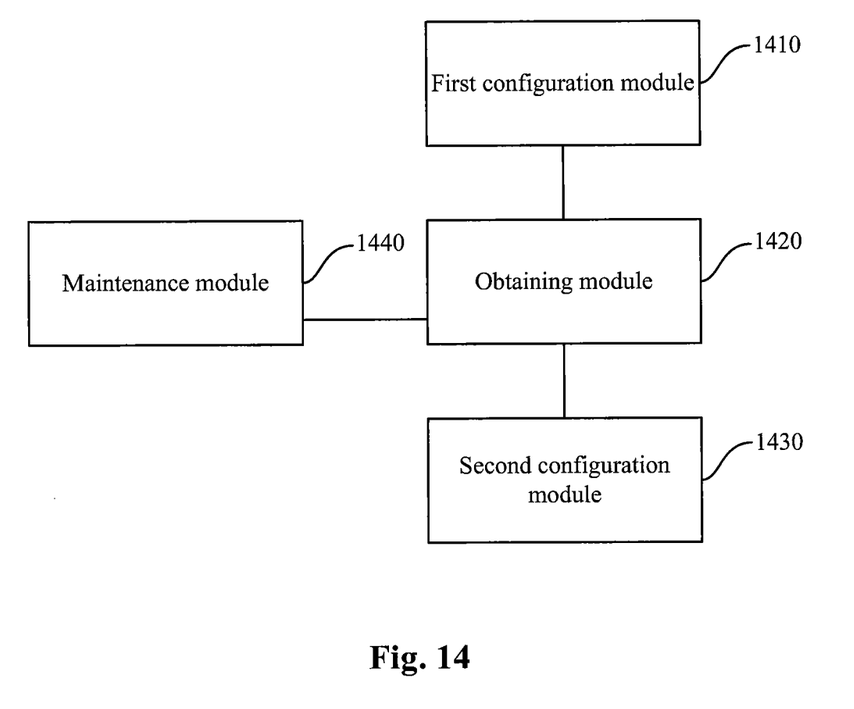
FIG. 14 is a structure diagram of the network device of eighth embodiment of the present invention.

As shown in FIG. 14, it is a structure diagram of the network device of eighth embodiment of the present invention, comprising:

The first configuration module 1410, which is used for the UE configuring a multicarrier work pattern;

Obtaining module 1420, obtaining TA group information corresponding to each of a plurality of CCs of the UE configured by the first configuration module 1410;

The said obtaining module 1420, which is used for dividing the said UE's each CC to different TA group, according to the network deployment or the data transmission on each CC by the UE; or Dividing different CC to different TA group; or Dividing TA group according to each configured CC's frequency information for the said UE, among, dividing the same frequency CC to the same TA group.

The second configuration module 1430, which is used for configuring the said obtaining module obtained TA group information to the UE.

The said second configuration module 1430, which is used for configuring each CC belonging to TA group information or the relationship between CC and TA group to the UE via RRC signal or MAC CE.

Maintenance module 1440, which is used for maintaining the TA timer of each TA group according to the obtaining module 1420 obtained, and doing uplink synchronization with the UE.

The said maintenance module 1440, which is used for measuring the UE in the TA information of CC, and sends to UE via any CC or fix CC belonging to the TA group.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Figure 15:
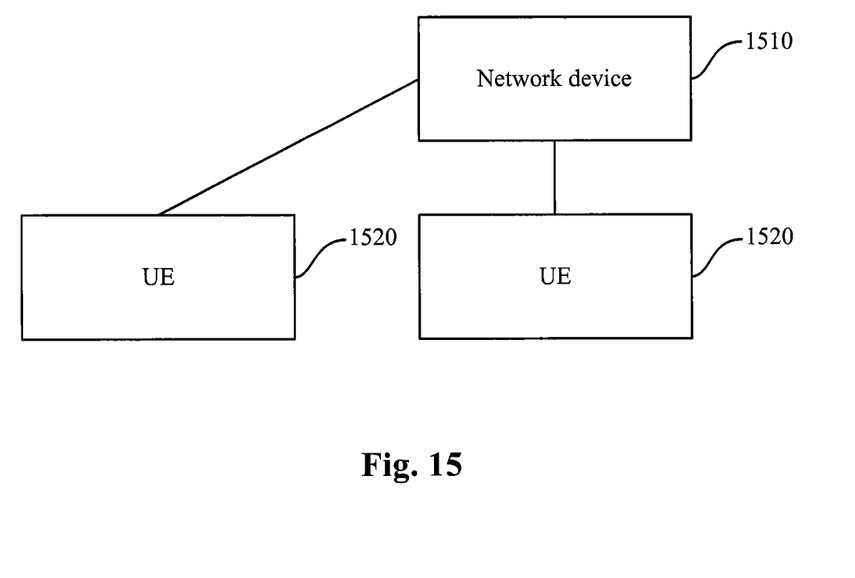
FIG. 15 is a systematic structure diagram of an uplink synchronization of ninth embodiment of the present invention.

As shown in FIG. 15, it is a systematic structure diagram of an uplink synchronous of ninth embodiment of the present invention The network device 1510, which is used for the UE 1520 configuring a multicarrier work pattern, and obtaining the each CC corresponding TA group information of the UE 1520; maintaining the TA timer of each TA group, and doing uplink synchronization with the UE 1520;

The UE 1520, which is used for obtaining the multicarrier work pattern the network device 1510 configured, and doing uplink synchronization with the network device 1510.

The invention of the example technology scheme has the following advantages, by achieving TA group information the CC corresponding of UE, and maintaining the TA timer of each CC according to TA group information, doing uplink synchronization, it is provided an uplink synchronization maintenance mechanism in the case of different uplink timing on the different CCs.

Embodiments of the present invention provide a kind of UE, comprising:

The first configuration module, which is used for the UE configuring a multicarrier work pattern;

Obtaining module, which is used for obtaining the each CC corresponding TA group information of the UE;

Maintenance Module, which is used for maintaining the TA timer of each TA group according to the obtaining module obtained, and doing uplink synchronization with the network side.

The said obtaining module, which is used for obtaining TA group information according to network show or implicit signaling configuration; or Achieve each CC corresponding TA group information of the UE according to the same principle of the network device.

The said obtaining module, which is used for dividing TA group according to each CC belonged to frequency information for the said UE configured, among, dividing the same frequency CC to the same TA group.

Through the description of the embodiments above, the technical personnel in this field can understand clearly that the present invention can be implemented by software and necessary current hardware platform. Of course can also through the hardware, but in many cases the former is better implementation ways. Based on this understanding, the technical program of the present invention or the part of contributing to the existing technology can be embodied by a form of software products which can be stored in storage medium, including a number of instructions for making a terminal device (such as mobile phone, personal computers, servers, or network equipments, etc.) implement the methods described in the embodiments of the present invention.

The descriptions above are just preferred implement ways of the present invention. It should be pointed that, for general technical personnel in this field, in not digress from the principle of the present invention premise, some improvement and decorating can be done, which should be as the protection scope of the present invention.

The technical personnel in this field can understand the example of the device module can be according to the example to describe the distribution in the example in the device, also can undertake corresponding change is located in different from this example of one or more devices. The above example of the module can be integrated in a body, also can separate the deployment, can be combined into a module, can further fractionation with more than one module.

The above serial number of embodiments of the present invention is only for describing, and doesn't represent that the embodiment good or bad.

The above embodiments are only parts of the embodiments of the present invention, however, the embodiments of the present invention isn't limited to the above embodiments. Any change that the technical personnel in this field can think of should be belong to the scope of the patent protection of the embodiments of the present invention.

The invention claimed is:

1. An uplink synchronization method, comprising steps of:
   setting, by a network device, a multicarrier operation mode for a user equipment (UE), obtaining, by the network device, timing advance (TA) group information corresponding to each of a plurality of component carriers (CCs) of the UE; and
   maintaining, by the network device, a TA timer of each of a plurality of TA groups according to the TA group information, and conducting by the network device, uplink synchronization with the UE,
   wherein the step of obtaining, by the network device, TA group information corresponding to each of the plurality of CCs of the UE comprises a step of:
   dividing, by the network device, the CCs of the UE into respective TA groups, according to network deployment or data transmission on each CC by the UE; or
   dividing, by the network device, different CCs to respective TA groups; or
   dividing, by the network device, the CCs into the plurality of TA groups according to frequency bands that each of the CCs belongs to and are set for the UE, wherein the network device divides the CCs in a same frequency band as a same TA group,
   after the step of obtaining, by the network device, TA group information corresponding to each of a plurality of CC's of the UE, the method further, comprises a step of:
   setting, by the network device, the TA group information to the UE, to enable the UE to maintain the TA timer of each of the TA groups according to the TA group information, and conduct the uplink synchronization with the network device.

2. The method according to claim 1, wherein the step of setting, by the network device, the TA group information to the UE comprises a step of:
   setting, by the network device, the following information to the UE via radio resource control (RRC) signaling or media access control (MAC) control element (CE):
   information on the TA groups that each of the CCs belongs to.

3. The method according to claim 1, wherein the UE and the network device obtain the TA group information corresponding to each CC of the UE respectively.

4. The method according to claim 3, wherein
   the UE and the network device divide the CCs in a same frequency band into a same TA group respectively according to the frequency bands that each of the CCs belongs to and are set for the UE.

5. The method according to claim 1, wherein the step of setting, by the network device, the TA group information to the UE, to enable the UE to maintain the TA timer of each of the TA groups according to the TA group information, and conduct the uplink synchronization with the network device comprises a step of:
   upon one of the CCs in one of the TA groups receiving a TA command, restarting enabling, by the network device, the UE to restart the TA timer of the one of the TA groups, and use, the TA command on all of the CCs in the one of the TA groups.

6. The method according to claim 1, wherein the step of maintaining by the network device, a TA timer of each of a plurality of TA groups according to the TA group information comprises a step of:

detecting, by the network device, the TA information corresponding to one of the CCs of the UE, and sending, by the network device, the TA information to the UE via a predetermined CC or any CC in the TA group that the one of the CCs belongs to.

7. The method according to claim 1, wherein after the step of setting, by a network device, a multicarrier operation mode for a UE, the method further comprises a step of:

maintaining, by the UE, the TA timer of each of the CCs, and conducting, by the UE, the uplink synchronization with the network device.

8. The method according to claim 1, wherein the step of setting, by the network device, the TA group information to the UE comprises a step of:

setting, by the network device, the following information to the UE via radio resource control (RRC) signaling or media access control (MAC) control element (CE):

a relationship between the CCs and the TA groups.

9. A network device, wherein, comprising:

a first configuration module, configured for setting multicarrier operation mode for a user equipment (UE);

an obtaining module, configured for obtaining time advance (TA) group information corresponding to each of a plurality of component carriers (CCs) of the UE in the first configuration module; and a maintenance module, configured for maintaining a TA timer of each of a plurality of TA groups according to the TA group information, and conducting uplink synchronization with the UE, wherein the obtaining module divides the CCs of the UE into different TA groups, according to network deployment or data transmission on each CC by the UE; or the obtaining module divides different CCs to respective TA groups; or the obtaining module divides the CCs into the plurality of TA groups according to frequency bands that each of the CCs belongs to and are set for the UE, wherein the obtaining module divides the CCs in a same frequency band into a same TA group, wherein the network device further comprises:

a second configuration module, configured for setting the TA group information obtained by the obtaining module to the UE, to enable the UE to maintain the TA timer of each of the TA groups according to the TA group information, and conduct the uplink synchronization with the network device.

10. The network device according to claim 9, wherein the second configuration module, sets the following information to the UE via radio resource control RRC signaling or media access control (MAC) control element (CE):

information on the TA groups that each of the CCs belongs to.

11. The network device according to claim 9, wherein the maintenance module detects the TA information corresponding to one of the CCs of the UE, and sends the TA information to the UE via a predetermined CC or any CC in the TA group that the one of the CCs belongs to.

12. The network device according to claim 9, wherein the second configuration module, sets the following information to the UE via radio resource control RRC signaling or media access control (MAC) control element (CE):

a relationship between the CCs and the TA groups.

* * * * *